United States Patent [19]

Kupka

[11] Patent Number: 5,474,675
[45] Date of Patent: Dec. 12, 1995

[54] FILTER SEPARATOR FOR SEPARATING A COMPOSITE FLUID

[75] Inventor: Dieter Kupka, Rain/Lech, Germany

[73] Assignee: Herco-CFF ChiralFlow Filtertechnik GmbH, Freiberg/Neckar, Germany

[21] Appl. No.: 688,938

[22] PCT Filed: Nov. 17, 1989

[86] PCT No.: PCT/EP89/01386

§ 371 Date: May 9, 1991

§ 102(e) Date: May 9, 1991

[87] PCT Pub. No.: WO90/05576

PCT Pub. Date: May 31, 1990

[30] Foreign Application Priority Data

Nov. 17, 1988 [EP] European Pat. Off. ............... 88119066

[51] Int. Cl.$^6$ .................................................. B01D 33/00
[52] U.S. Cl. ........................... 210/224; 210/262; 210/294; 210/298; 210/380.1; 210/415
[58] Field of Search ..................................... 210/298, 294, 210/224, 262, 413, 415, 380.1

[56] References Cited

U.S. PATENT DOCUMENTS

| | | | |
|---|---|---|---|
| 3,497,060 | 2/1970 | Tra et al. ................................. | 209/273 |
| 4,062,771 | 12/1977 | Saupe ....................................... | 210/637 |
| 4,714,549 | 12/1987 | DiLeo ...................................... | 210/224 |
| 4,935,002 | 6/1990 | Gordon ................................... | 210/780 |
| 5,154,825 | 10/1992 | Kupka ..................................... | 210/415 |
| 5,234,589 | 8/1993 | Sussich et al. ......................... | 210/298 |

FOREIGN PATENT DOCUMENTS

| | | |
|---|---|---|
| 0178389 | 4/1986 | European Pat. Off. . |
| 0338432 | 10/1989 | European Pat. Off. . |
| 2558683 | 7/1977 | Germany . |

OTHER PUBLICATIONS

Ullmann's Encyclopedia of Industrial Chemistry, Edition 1988, vol. B2, pp. 10–48 to 10–54.

*Primary Examiner*—Virginia Manoharan
*Attorney, Agent, or Firm*—Brooks Haidt Haffner & Delahunty

[57] ABSTRACT

A filter separator for decomposing a fluid consisting of a mixture of liquids containing solid components has a filter press combined with a micro- and ultrafiltration apparatus. The filter press separates the solid components from the fluid and the micro- and ultrafiltration apparatus separates from one another liquid components according to their different molecular structures. A modular construction with a very compact design and relatively large filter surface areas is shown and described.

27 Claims, 8 Drawing Sheets

FILTER SEPARATOR FOR SEPARATING A COMPOSITE FLUID

The invention relates to a filter separator for decomposing into its various components a fluid consisting of a liquid mixture containing solid components.

In numerous technical applications there occurs the problem of decomposing fluids containing solid components and liquids of different molecular structure, specifically of separating the solid components therefrom and the different liquid components from one another. Fluids of this type may for instance originate from sewages, sewage sludges, mashes, pharmaceutical liquids, from the fruit juice industry and generally from the food industry as well as from washing installations. Fluids of this type contain solid components of different kinds and compositions such as synthetic and natural fibres, soot, lubricant residues, toxides, oils, dissolved heavy metal compositions as well as detergents, surfactants and the like employed in washing processes. Fluids contaminated in this manner cannot be discharged into the sewage system nor can they be employed in subsequent production steps, but have rather to be decontaminated or decomposed. In many cases it is also desirable to reclaim the solid and liquid components of such fluids for renewed use or further processing and/or to concentrate the solid components for space-saving storage or disposal or as required for subsequent processing. This treatment should if possible be carried out in a contamination-free manner so as to avoid environment pollution. Installations capable of solving these problems and of being accommodated in a limited space, for instance in existing sewage disposal or treatment plants, car wash installations and various industrial installations, and additionally capable of high production or through-put rates, have not as yet become known. Up to the present the treatment of such fluids rather required intricate and voluminous installations with relatively extended filter surface areas, and the separation of sufficient amounts of clear filtrates required high pumping pressures for overcoming sediment-induced resistances.

It is an object of the invention to provide a filter separator of the type defined above, which is of compact construction and capable of separating the solid components from a composite fluid and of separating the liquid components thereof from one another.

SUMMARY OF THE INVENTION

The invention permits fluids containing solid components and composed of liquids having different molecular structures to be decomposed into their various components either in a continuous or charge-wise operation, and achieves this purpose with a compact construction which is readily serviceable, operates with economical energy consumption and is readily capable of being adapted to prevailing operative requirements by the proper selection of its dimensions and the filter media to be employed. In the filter separator according to the invention, the decomposition of solids-containing fluids into their components occurs in two different sections of the apparatus, namely, in a first section in which the solid components are concentrated by filtration of the fluid, proper selection of the filter medium employed in this first section also permitting at the same time one of the liquid components to be retained, and a second section in which the filtered fluid from the first section is decomposed into the remaining liquid components of different molecular structure.

According to the invention, respective rotary speed may be suitably controlled to thereby create transverse fluid flows of different speeds adjacent individual filter surfaces of the separator, these fluid flows being directed substantially tangential to the surface of the respective filter media and effective to prevent the filter media from being prematurely clogged by retained components, so that higher filtrate through-put rates and manifold increased product output can be achieved with a dynamically operated apparatus of relatively small dimensions.

For the generation of transverse fluid flows it was formerly customary to employ disc-shaped rotors, in which case the decrease of the circumferential speed towards the center of the rotor resulted in gradually varying speeds of the fluid flow over the filter surfaces. In contrast thereto, the separator according to the invention permits a completely uniform flow speed of the fluid over the entire filter surface area to be generated in each annular chamber of the filter press, resulting in substantially uniform filtrate flow through the filter surfaces and permitting relatively increased throughput rates to be achieved. In this manner it is possible to achieve a substantially increased economic efficiency in addition to the novel technological advantages resulting from the universal applicability of the separation or decomposition process.

Other fields of application in addition to the ones named above include for instance the chemical, pharmaceutical, beverage and food industries, the filtration of solvents and the processing of sewages and sewage sludges.

BRIEF DESCRIPTION OF THE DRAWINGS

Embodiments of the invention shall now be described by way of example with reference to the accompanying drawings, wherein.

DETAILED DESCRIPTION OF PREFERRED EMBODIMENTS

Figure 1:
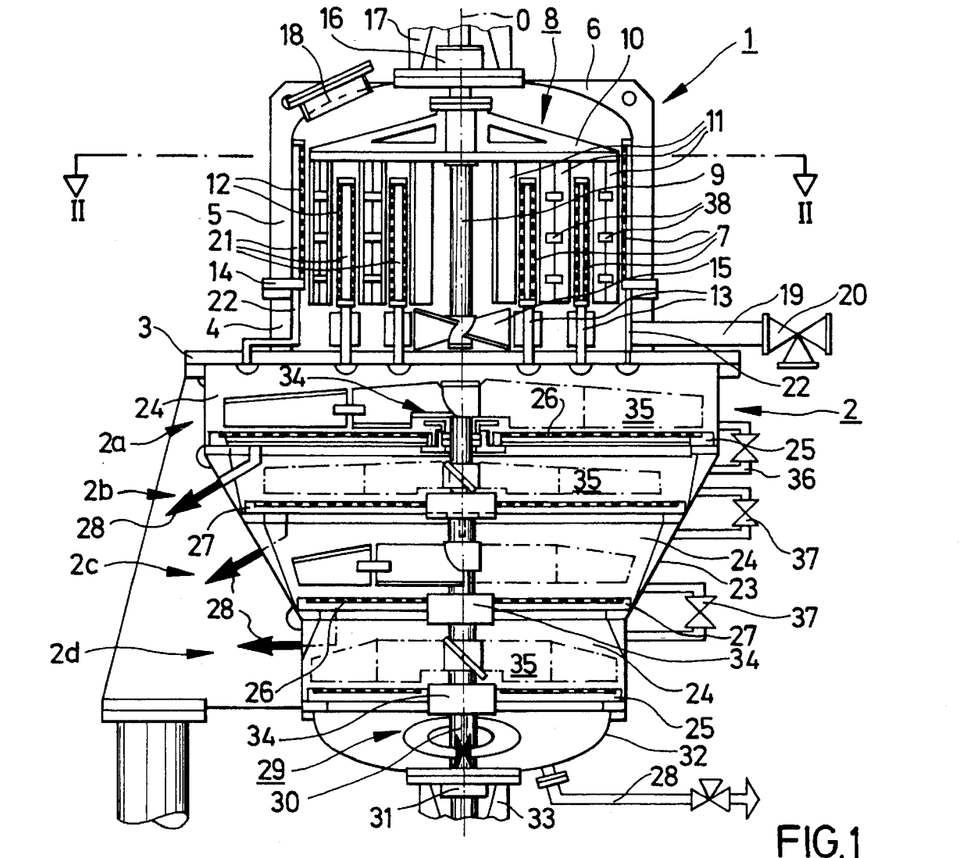
FIG. 1 shows an axially sectioned view of a filter separator according to one embodiment of the invention, comprising a filter press in an upper section and a micro- and ultrafiltration apparatus in a lower section, the two sections being combined in a single structural unit in the illustrated example.

The filter separator shown in FIG. 1 is composed of a filter press generally indicated at 1, and a micro- and ultrafiltration apparatus generally indicated at 2 disposed below filter press 1 and directly connected thereto. In the example shown, filter press 1 and filtration apparatus 2 are connected to one another at a common end wall 3. This is not necessarily so, however, as the two components may also be designed as separate units, since the products discharged from filter press 1 are fluid and may therefore be readily conveyed through pipe conduits connecting filter press 1 to a micro- and ultrafiltration apparatus 2 installed separately therefrom. Filter press 1 and filtration apparatus 2 are advantageously disposed with their respective axis vertical, since in this case the discharge of the products derived therefrom is facilitated.

Filter press 1 comprises a cylindrical pressure vessel composed of a bottom portion 4 connected to end wall 3, and a top portion 5 mounted thereon by a flanged connection and integrally formed with a top end wall 6. Disposed in the pressure vessel in a concentric arrangement about the vessel's axis 0 are several, in the present example three, filter elements 7 in the form of cylindrical wall members of different diamaters. The two inner filter elements 7 are supported on bottom end wall 3, while the outer filter element is secured to and exteriorly bounded by the interior wall surface of vessel top portion 5.

Housed in pressure vessel 4, 5 is a rotor generally indicated at 8 and comprising a rotor shaft 9 extending along vessel axis 0, a radial mounting structure 10 extending radially away from shaft 9 at a location above filter elements 7, and rotor elements 11 secured to radial mounting structure 10 and extending axially away therefrom substantially parallel to filter elements 7 and adjacent the filter media carried thereby as indicated at 12 in FIG. 1.

As shown in this figure, each of the two inner filter elements 7 carries two filter media 12, while the outer filter element 7 fitted to vessel top portion 5 has only one filter medium 12. The two inner filter elements 7 are supported on bottom end wall 3 by means of tubular spacers 13 extending from their lower ends. The outer filter element 7 fitted to top portion 5 extends downwards therein to the level of the connecting flange 14 of top portion 5. An agitator 15 is disposed below filter elements 7 and secured to rotor shaft 9. Its diameter is smaller than the interior diameter of the innermost filter element 7.

Rotor shaft 9 extends through a sealed slide ring bearing 16 mounted in top end wall 6 and adapted to be rotated by an electric motor (not shown) mounted on a bearing structure of which FIG. 1 merely shows lower leg portions 17 secured to top end wall 6 from above by a flanged connection.

Top portion 5 of pressure vessel 4, 5 is provided with an inlet port 18 for the fluid to be filtered. Bottom portion 4 is provided at a lower location with an outlet port 19 for the concentrated fluid, i.e. the fluid containing a higher proportion of solids, outlet port 19 being provided with a shut-off valve 20.

The filter media 12 on each filter element 7 define a filtrate chamber 21 communicating in the case of the inner filter elements 7 with a respective tubular spacer 13, and in the case of the outer filter element 7, with outlet pipes 22 extending along the wall of vessel bottom portion 4 and through connecting flange 14 to open into a respective filtrate chamber 21 of outermost filter element 7.

In the example shown, the pipe members 13 and 22 serving for the discharge of the filtrate open through bottom end wall 3 directly into a first section of micro- and ultrafiltration apparatus 2 disposed therebelow. They may also be connected, however, to at least one outwards extending conduit, for instance when the mentioned first section of micro- and ultrafiltration apparatus 2 should be at least partially bypassed.

In the example shown, micro- and ultrafiltration apparatus 2 is composed of four sections 2a, 2b, 2c and 2d disposed below one another, the three upper sections 2a to 2c being of progressively diminishing diameter. Micro- and ultrafiltration apparatus 2 has therefore a housing having cylindrical upper and lower sections and a conical intermediate section.

Each section 2a to 2d of micro- and ultrafiltration apparatus 2 includes an inlet chamber 24 and a filtrate chamber 25 disposed therebelow and separated therefrom by a micro- or ultrafiltration medium 26 substantially shaped as a circular disc. These filter media 26 are tension-fitted to disc-shaped filter elements 27 the bottom surfaces of which may at the same time act as partitions separating the individual sections 2a to 2d of micro- and ultrafiltration apparatus 2 from one another. These disc-shaped filter elements 27 may be of one-piece construction, preferably, however, and for reasons to be explained later on, they are each composed of several pieces, specifically of two pieces, so as to facilitate their removal from the filtration apparatus for replacement of the filter media.

The filtrate chambers 25 of micro- and ultrafiltration apparatus 2 are provided with outwards opening outlet ports 28 as diagrammatically indicated by arrows in FIG. 1.

Micro- and ultrafiltration apparatus 2 contains a rotor generally indicated at 29 and comprising a rotor shaft 30 extending through a sealed slide ring bearing 31 mounted in a bottom end wall 32 of micro- and ultrafiltration apparatus 2, and adapted to be rotated by an electric motor (not shown) mounted on a bearing structure of which FIG. 1 merely shows lower leg portions 33 secured to bottom end wall 32. Rotor shaft 30 extends through filter elements 27 by way of rotatable slide ring seals 34 and carries a respective rotor element 35 in each inlet chamber 24, each rotor element 35 preferably comprising a plurality of radial arms extending away from rotor shaft 30 closely above the respective micro- or ultrafiltration medium 26.

As also shown in FIG. 1, the inlet chambers 24 of the individual sections 2a to 2d of filtration apparatus 2 are connected to one another by connection pipes 36 each including a shut-off valve 37. It is thus possible to supply all inlet chambers parallel to one another with the fluid to be filtered. On the other hand it is also possible to control the supply to individual inlet chambers in such a manner that any inlet chamber receives a fluid which has already been raised to a higher concentration by a previous filtration step. It is also conceivable to connect the filtrate outlet port of one section to the inlet chamber of a downstream section, this alternative being not, however, shown in FIG. 1 for reasons of clarity.

Figure 2:
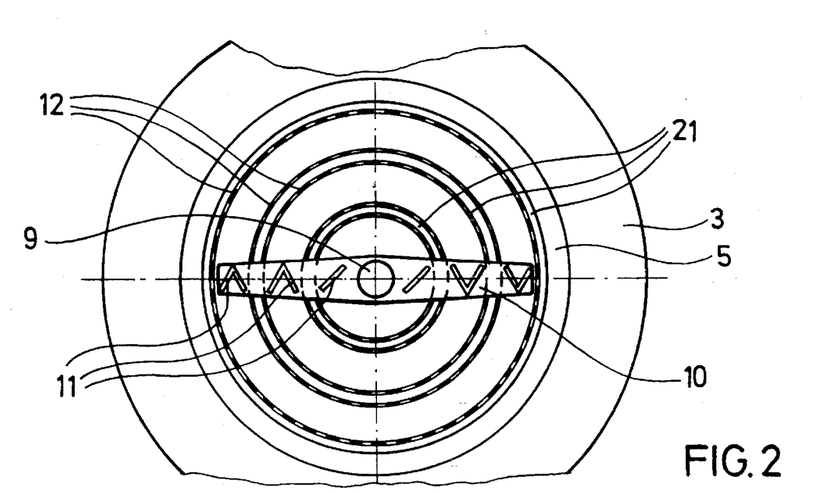
FIG. 2 shows a radial section through the filter separator of FIG. 1, taken along the line II—II in FIG. 1.

FIG. 2 depicts a radial section through the separator of FIG. 1 taken along the line II—II in this figure. Particularly shown is the radial mounting structure 10 which in the present case is a two-armed construction. It is secured to rotor shaft 9 above the filter elements of which only the filtrate chambers 21 and filter media 12 are shown in this figure. Each arm of radial mounting structure 10 carries a total of three rotor elements 11 the two outer ones of which are designed as a double-faced construction in view of their being associated to two adjacent filter media. A more detailed description of FIG. 2 can be dispensed with.

In operation a fluid is supplied to the interior of pressure vessel 4, 5 through inlet port 18. This fluid may be supplied under hydraulic pressure to thereby accelerate the filtering operation. Also, the fluid may be supplied to pressure vessel 4, 5 in a continuous operation. Shut-off valve 20 at outlet port 19 is closed. During the filtering operation rotor 8 is rotated, causing the bar-shaped rotor elements 11 to revolve along a path between filter elements 7 to thereby create a strong transverse flow of the fluid which is effective to prevent filter media 12 from being prematurely clogged by the solids component of the fluid. At the same time agitator propeller 15 is rotated so as to create a fluid flow in the bottom portion of filter press 1. For creating a strongly turbulent flow of the fluid, rotor elements 11 may be formed with suitable openings 38, optionally with venturi nozzles (not shown) inserted therein for still further enhancing the turbulence in the fluid flow.

The supply of the fluid is continued until the solids concentration of the fluid within the fluid space of pressure vessel 4, 5 has attained the desired degree. The filtrate collected during the filtering operation in filtrate chambers 21 of filter elements 7 is drained therefrom through pipes 13 and 22 and supplied in the example shown to inlet chamber 24 of the uppermost section 2a of micro- and ultrafiltration apparatus 2. After the fluid in filter press 1 has attained the desired solids concentration, shut-off valve 20 of outlet port 19 is opened, so that the thus condensed fluid is drained from filter press 1. The condensed fluid may then be subjected to further treatment, particularly in a filter press of the type disclosed in European Patent 226,659.

Simultaneously with the operation of filter press 1, the filtrate drained therefrom, which preferably is then only composed of liquid components, is processed in micro- and ultrafiltration apparatus 2. In the example shown, the filtrate drained from filter press 1 is supplied directly to the uppermost section 2a, wherein liquid components of a predetermined molecular structure are separated from the supplied filtrate by the employ of a suitably selected filter medium 26 in this section. In the course of time this results in an increasing concentration of liquid components having other molecular structures in inlet chamber 24. After a certain concentration has thus been attained, these liquid components may then be transferred to the inlet chamber of the next lower section 2b by opening valve 37 in the associated connecting pipe 36.

In the second section 2b of micro- and ultrafiltration apparatus 2, the liquid transferred to its inlet chamber 24 may be subjected to a filtration treatment comparable to the treatment carried out in first section 2a. The same applies to the remaining sections 2c and 2d. If it is desired to supply the filtrate drained from filter press 1 simultaneously to inlet chambers 24 of all sections 2a to 2d, shut-off valves 37 are left open throughout the filtering operation.

In the course of the filtering operation the rotor 29 in the micro- and ultrafiltration apparatus is in continuous operation. Its arm-shaped rotor elements 35 disposed in inlet chambers 24 are effective to create transverse fluid flows for preventing filter media 26 from becoming prematurely clogged. This may be achieved by a suitable configuration of the rotor element arms, which may advantageously be provided with through-openings and venturi nozzles for generating turbulent flow conditions in the inlet chambers.

When the filter separator is to be serviced, for instance when the filter media are to be inspected and, if need be, replaced, the connection between flange 14 of the top portion 5 of filter press 1 and its counterpart on bottom portion 4 is released, whereupon top portion 5 including rotor 8 is lifted off bottom portion 4 as by means of a crane. The inner filter elements 7 supported on bottom end wall 3 are then accessible for inspection and maintenance. As will be described later on, filter elements 7 are advantageously composed of several segments joined to one another in the circumferential direction, because a construction of this kind facilitates the inspection and replacement of the filter media. The outer filter element 7 secured to top portion 5 of the vessel is likewise readily accessible for inspection and replacement after the top portion has been raised. This filter element should likewise be composed of several segments abutting one another in the circumferential direction.

For inspection and maintenance of micro- and ultrafiltration apparatus 2, vessel bottom portion 4 including its end wall 3 and the filter elements 7 supported thereon is separated from housing 23 and lifted thereoff. As a result, inlet chamber 24 of the uppermost section 2a of micro- and ultrafiltration apparatus 2 including the filter medium 26 provided therein is immediately accessible. The replacement of filter medium 26 is preferably accomplished by bodily lifting filter element 25 from uppermost section 2a. To this purpose rotor shaft 30 should consist of a plurality of axially aligned and interlocked sections so as to initially permit the uppermost rotor element 35 to be lifted off. Otherwise filter element 25 could be composed of at least two pieces capable of being removed from micro- and ultrafiltration apparatus 2 without disassembly of the rotor. In any of the two cases the removal of the uppermost filter element 25 gives access to the filter element 25 of the next lower section 2b and so on.

Within filter press 1 as well as within micro- and ultrafiltration apparatus 2, the respective filter media are preferably secured to the associated filter elements by means of resilient O-rings clampingly received in grooves formed for this purpose in the carrying bodies of the filter elements as will be explained in detail later on.

Figure 3:
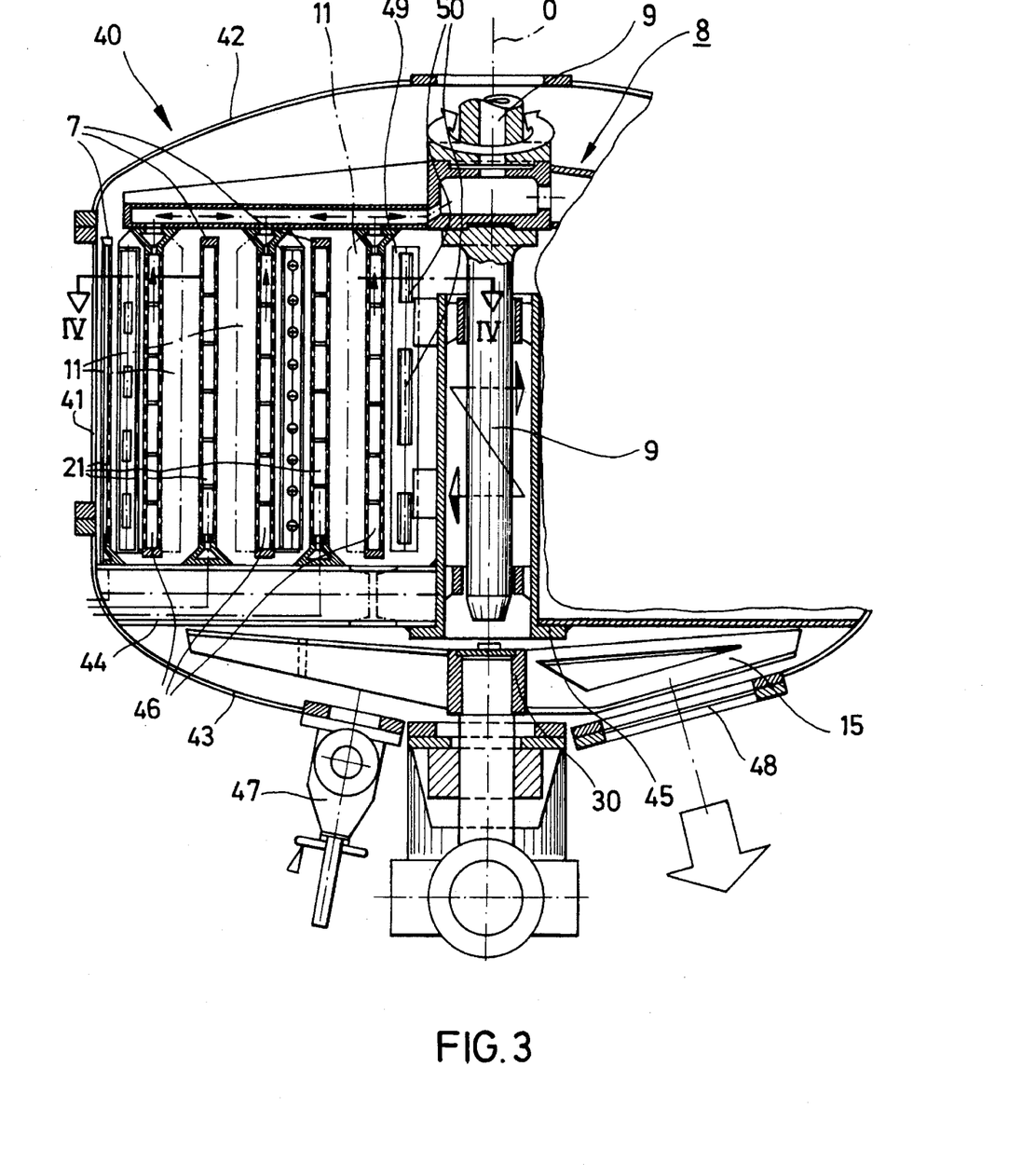
FIG. 3 shows an axially sectioned view of a second embodiment of a filter press for use in a filter separator.
Figure 4:
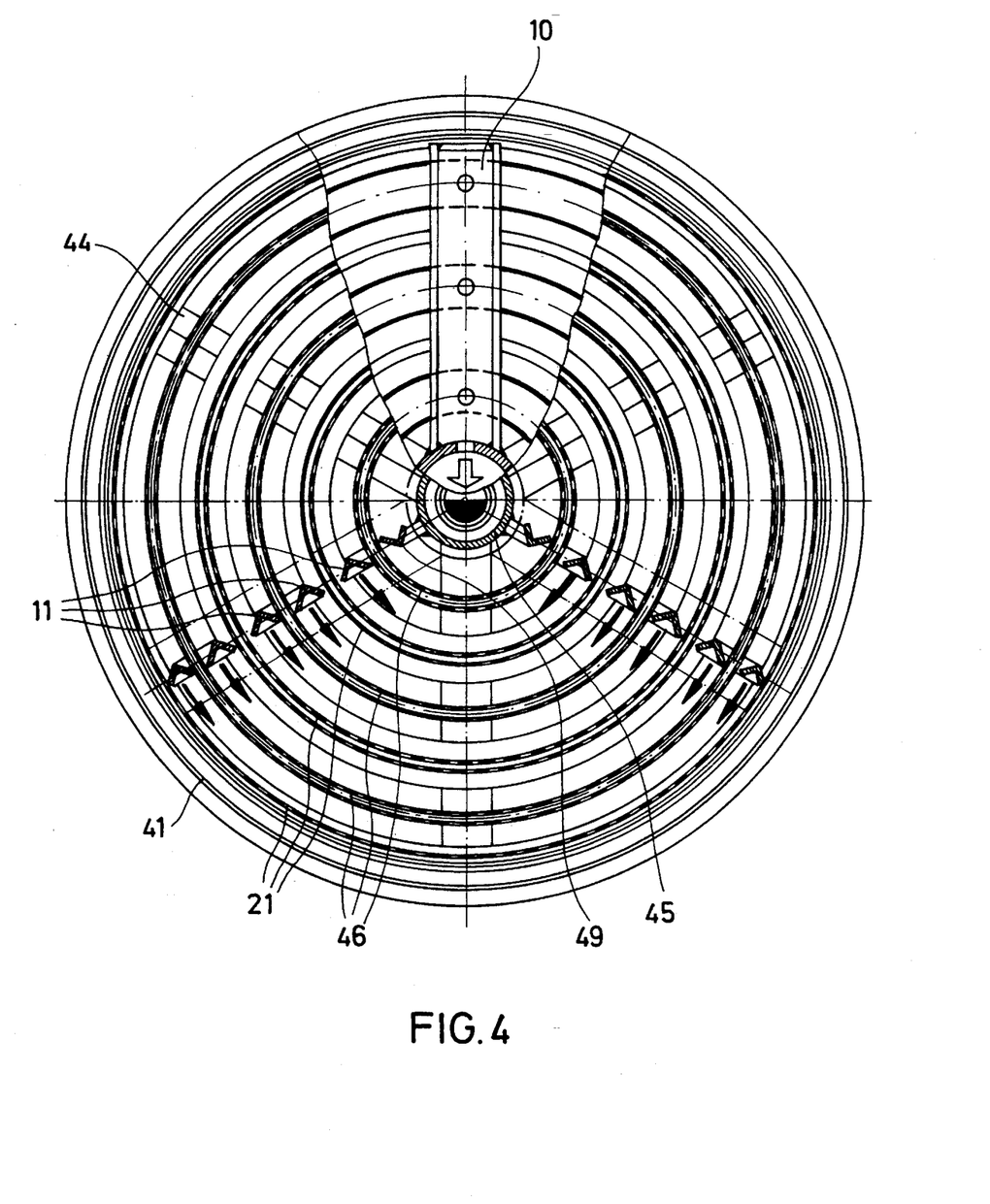
FIG. 4 shows a radial section taken along the line IV—IV in FIG. 3.

FIG. 3 shows a filter press suitable for employ in the filter separator according to the invention. The filter press comprises a cylindrical vessel 40 having a cylindrical sidewall 41 which may be of double-walled construction for passing a temperature-control medium therethrough as generally known and therefore not illustrated, a top end wall 42 and a bottom end wall 43. Supported on bottom end wall 43 of vessel 40 is a carrier structure 44 provided with tubular carrier members supporting a plurality of stationary filter elements 7 in the form of cylindrical wall members of different diameters secured to the carrier members in a concentric arrangement about the axis 0 of the vessel. In the present example there are three such filter elements 7. Filtrate chambers 21 defined in each filter element 7 communicate with the interior of the tubular carrier members of carrier structure 44, so that the filtrate collected therein can be drained from the vessel through an outlet port formed in bottom end wall 43 as diagrammatically indicated by an arrow on the right in FIG. 3.

Secured to carrier structure 44 at a concentric position with respect to vessel 40 is a guide sleeve 45 for guiding a rotor shaft 9 of a rotor 8, the latter including a radial mounting structure 10 including tubular mounting arms. The hollow interior of the mounting arms communicates with the interior of rotor shaft 9, the upper section of which is likewise of tubular construction. In top end wall 42 of vessel 40 rotor shaft is sealingly mounted by means of a slide ring seal not shown in FIG. 3 for the sake of clarity.

Disposed in a lower portion of vessel 40 below carrier structure 44 is an agitator 15 adapted to be rotated by an electric motor (not shown) secured to bottom end wall 43. The shaft 30 of agitator 15 extends through bottom end wall 43 and is sealed therein by a slide ring seal.

In this embodiment radial mounting structure 10 carries filter elements 46 formed as cylindrical wall members and extending down into the spaces defined between the filter elements supported on carrier structure 44 and into the space, respectively, defined between the innermost filter element 7 and guide sleeve 45. The filtrate chambers defined within these filter elements 46 communicate with the hollow interior of rotor shaft 9 by way of the tubular mounting arms of radial mounting structure 10. Also secured to radial mounting structure 10 of this embodiment are bar-shaped rotor elements 11 corresponding to the ones shown in FIG. 1 as regards their configuration and purpose. The bottom end wall 43 of vessel 40 is provided with a fluid inlet 47 and a closeable outlet port 48. The means for closing outlet port 48 is not shown in FIG. 3 for the sake of simplicity.

The embodiment of the filter press shown in FIG. 3 incorporates several specific advantages. The provision of the additional filter elements 46 secured to radial mounting structure 10 results in optimum utilization of the available space within the filter press. The close spacing between stationary filter elements 7 and rotatable filter elements 46 permits a transverse fluid flow to be created adjacent all of the filter elements by the rotation of the rotatable filter elements 46 associated to rotor 8. This transverse fluid flow is additionally enhanced by the bar-shaped rotor elements 11. Filtrates can thus be drained through stationary filter elements 7 and simultaneously through the rotatable filter elements 46 by way of the tubular section of rotor shaft 9. The thus condensed fluid can be drained through outlet port 48. The generation of the transverse fluid flow in the filter press can be still further enhanced by the operation of agitator 15. For promoting a turbulent flow pattern adjacent the inner face of the innermost one of the rotatable filter elements 46, at least one baffle 49, which may optionally be formed with openings 50, is secured to guide sleeve 45.

This embodiment of a filter press is to be considered as an independent element of the invention by itself, and may be employed for condensing a solids-containg fluid or the like when not installed in combination with a micro- and ultra-filtration apparatus.

Figure 5:
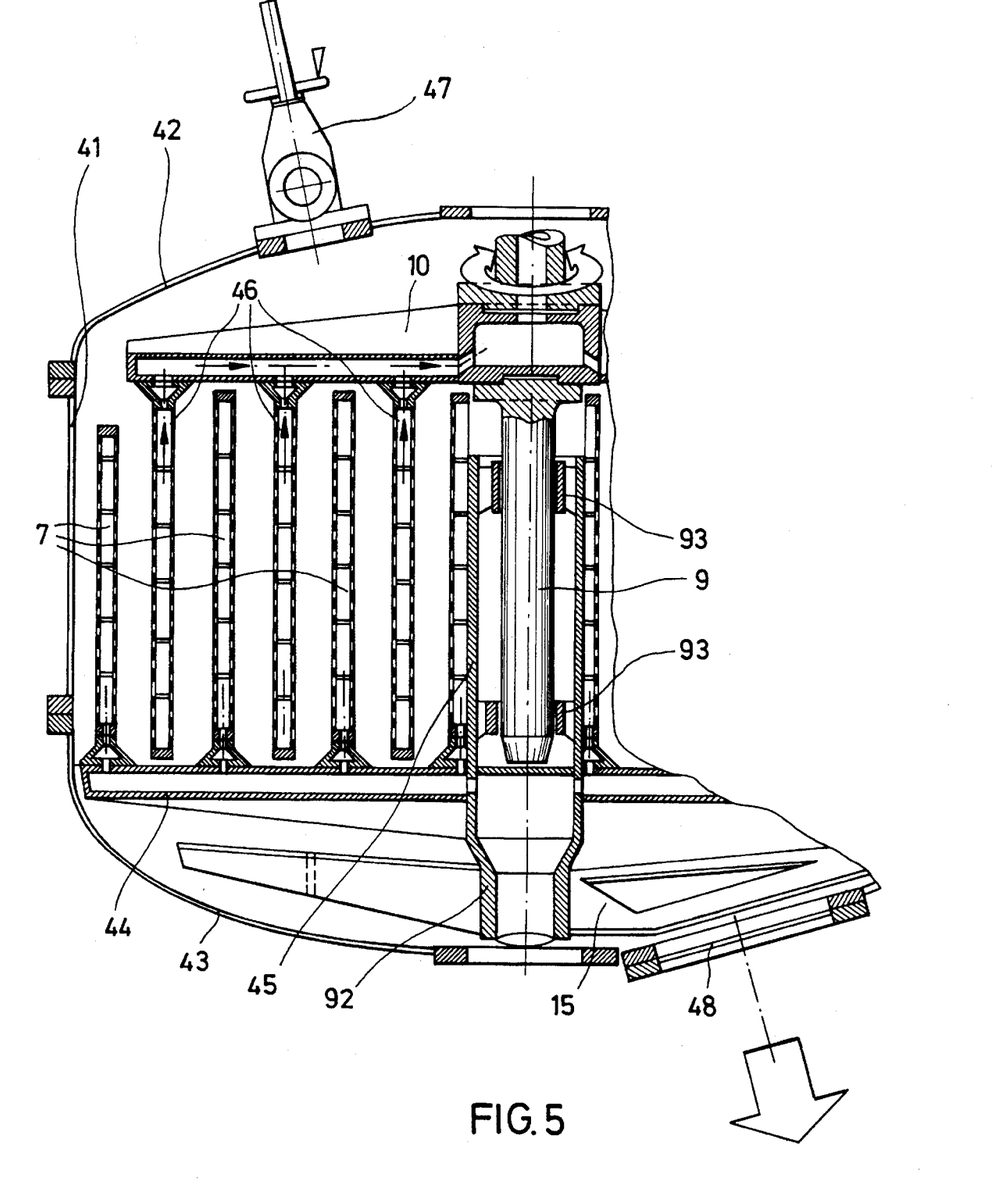
FIG. 5 shows an embodiment of a filter press including filter elements mounted for rotation in opposite directions.

In a further embodiment of the invention depicted in FIG. 5, the carrier structure 44 for filter elements 7 is secured to a shaft 92 extending through the vessel's bottom end wall 43 and sealed therein by the provision of suitable sealing structures not shown in the drawing. The carrier structure 44 of FIG. 5 comprises tubular carrier arms the interior of which communicates with the filtrate chambers of the filter elements 7 mounted thereon. Shaft 92 is likewise hollow, its interior communicating with that of the hollow carrier arms of carrier structure 44.

As in the case of the embodiment according to FIG. 3, the radial mounting structure 10 carries rotor elements in the form of cylindrical filter elements 46 extending downwards into the spaces between the filter elements 7 mounted on carrier structure 44.

In the embodiment of FIG. 5, the guide sleeve 45 of the embodiment according to FIG. 3 is integrally connected to shaft 92 and provided with internal guide elements 93 for concentrically guiding rotor shaft 9 to which radial mounting structure 10 is secured.

In the space between carrier structure 44 and bottom end wall 43 shaft 92 carries an agitator 15 secured thereto in such a manner that it extends closely above bottom end wall 43.

The two shafts 9 and 92 are connected to separate drive mechanisms (not shown) and adapted in operation to be rotated in opposite directions. This results in the creation of a forced transverse fluid flow adjacent the filter elements 7 and 46 within the fluid space of the filter press, so that it is not necessary to attach any additional flow-generating devices to any of the revolving filter elements. As a result it becomes also possible to provide relatively narrow spacings between the cylindrical filter elements 7 and 46 rotating in opposite directions, so that a vessel of a given size is capable of accommodating a greater number of filter elements, resulting in a considerable increase of the filter surface area.

For the remainder this embodiment of the invention corresponds to that of FIG. 3 except for the fact that the fluid inlet port 47 is provided in the vessel's top end wall 42 so as to permit continuous operation of the filter press with continuous discharge of solids through outlet port 48.

For cleaning purposes the vessel's end walls 42 and 43 should be readily separable from sidewall 41 to thereby give access to the filter elements.

This embodiment is likewise to be considered as an independent element of the invention on its own, and may be employed for practical use without the micro- and ultrafiltration apparatus in combination therewith.

Figure 6:
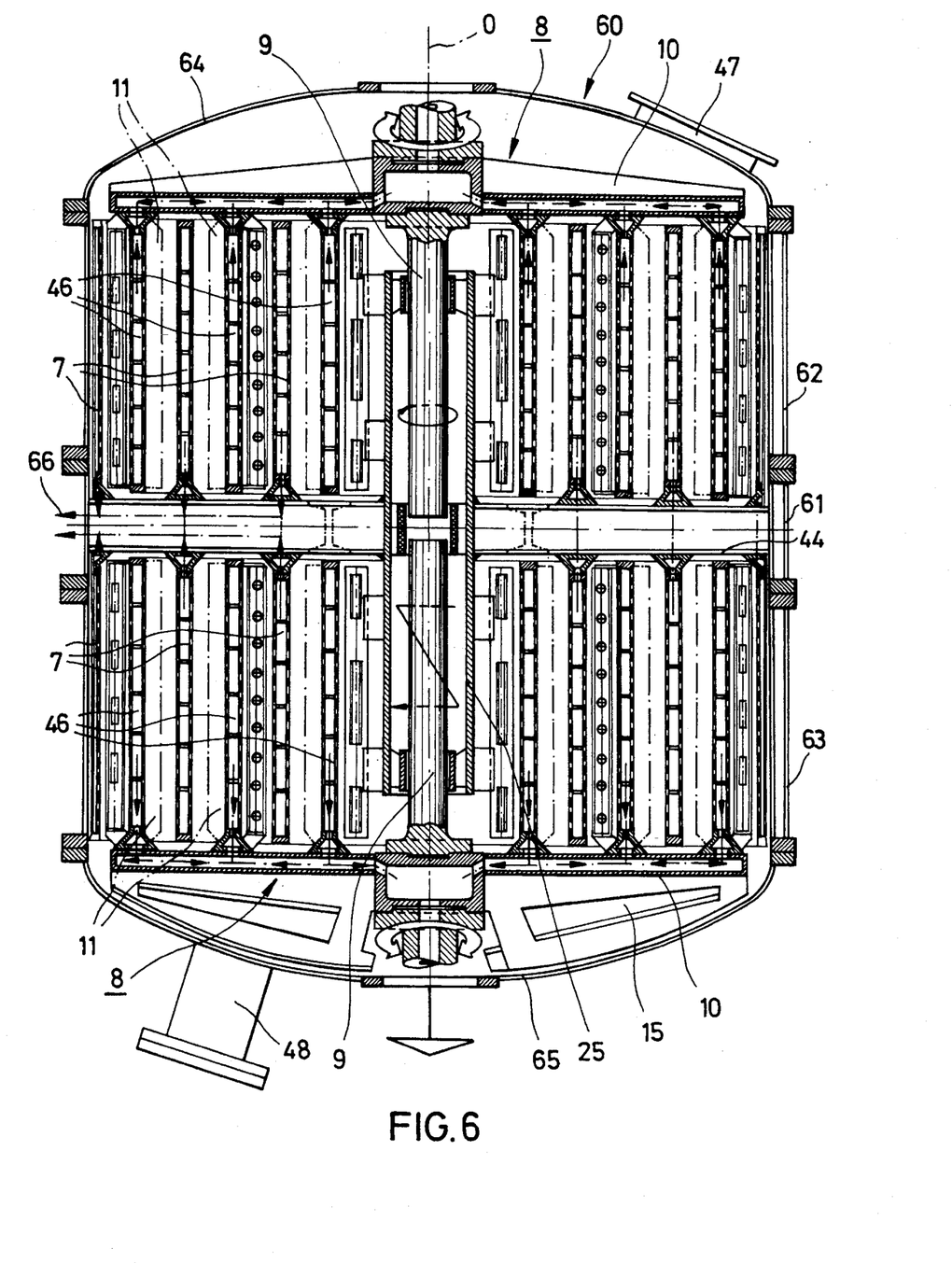
FIG. 6 shows an axially sectioned view of a third embodiment of a filter press designed as a twin structure having two rotors.

FIG. 6 illustrates a filter press of the general type shown in the left half of FIG. 3, designed, however, in a twin configuration. This filter press comprises a pressure vessel 60 having a cylindrical intermediate sidewall section 61, upper and lower cylindrical sidewall sections 62 and 63, respectively, connected to respective axial ends of intermediate section 61, and top and bottom end walls 64 and 65, respectively. Top end wall 64 is provided with a fluid inlet port 47, and a filter cake discharge port 48 is formed in bottom end wall 65. Suitable means not shown in the drawing are provided for selectively closing inlet and discharge ports 47 and 48, respectively. Upper and lower cylindrical sidewall sections 62 and 63 are connected to intermediate section 61 by readily releasable flange connections. In the same manner top and bottom and walls 64 and 65 are releasbly secured to upper and lower cylindrical sidewall sections 62 and 63, respectively.

Intermediate cylindrical sidewall section 61 surrounds a central carrier structure 44 including at least one hollow carrier member opening in a filtrate outlet port 66 in intermediate sidewall section 61 as diagrammatically indicated by arrows on the left in FIG. 6. With reference to the vertically extending axis 0 of vessel 60, carrying structure 44 carries on both its top and bottom sides a plurality of filter elements 7 formed as cylindrical wall members similar to the stationary filter elements in FIG. 3 and disposed in a concentric array about vessel axis 0. Extending through central carrier structure 44 and fixedly secured thereto is an elongate guide sleeve 25. At positions above upper filter elements 7 and below lower filter elements 7 there is provided a respective hollow radial mounting structure 10 secured to a respective rotor shaft 9 of an associated rotor 8. Rotor shafts 9 extend into guide sleeve 25 and are guided in bushings provided therein. The upper and lower end portions, respectively, of rotor shafts 9 are of hollow construction, their respective interior communicating with the hollow interior of the associated radial mounting structure 10. Secured to each radial mounting structure are several, in the present case three, filter elements 46 formed as cylindrical wall members the filtrate chambers of which communicate with the interior of the associated radial mounting structure 10. The thus mounted filter elements 46 extend into the spaces between the filter elements 7 mounted on carrier structure 44, and into the space, respectively, between the innermost of these filter elements and guide sleeve 25. In addition these filter elements 46 carry bar-shaped rotor elements 11 similar to the ones employed in the embodiment of FIG. 3.

Attached to the bottom side of lower radial mounting structure 10 are agitator blades 15 so as to extend closely adjacent the inner face of bottom end wall 65.

Rotor shafts 9 have their hollow sections mounted in the respective end wall 64 or 65 in a sealed manner by means of friction bearings (not shown) and are adapted to be rotated independently of one another by separate motors (likewise not shown).

Carrier structure 44 is composed of several carrier arms arranged in the manner of the spokes of a wheel so as to define open spaces therebetween.

The operation of this filter press is fully comparable to that of the embodiment shown on the left in FIG. 3. In the present example the lower rotor 8 performs the additional function during the filtering operation of keeping the fluid in the lower portion of vessel 60 in motion, and during discharge of the vessel, of conveying any solid residues possibly accumulated at this location towards discharge port 48. During normal operation of the filter press, discharge port 48 remains closed, the filtrates collected in the continuous operating mode being drained through the lateral outlet port 66 in the intermediate cylindrical sidewall section 61 and through the hollow end portions of rotor shafts 9. This filtering operation is continued until the fluid contained in pressure vessel 60 has been condensed to the desired concentration. The thus condensed fluid is then discharged through discharge port 48. As an alternative it is also possible to permit the accumulation on filter elements 7 and 46 of filter cakes which may then be removed therefrom in a reverse flow flushing operation or by means of suitable tools after the filter press has been opened for this purpose.

Figure 7:
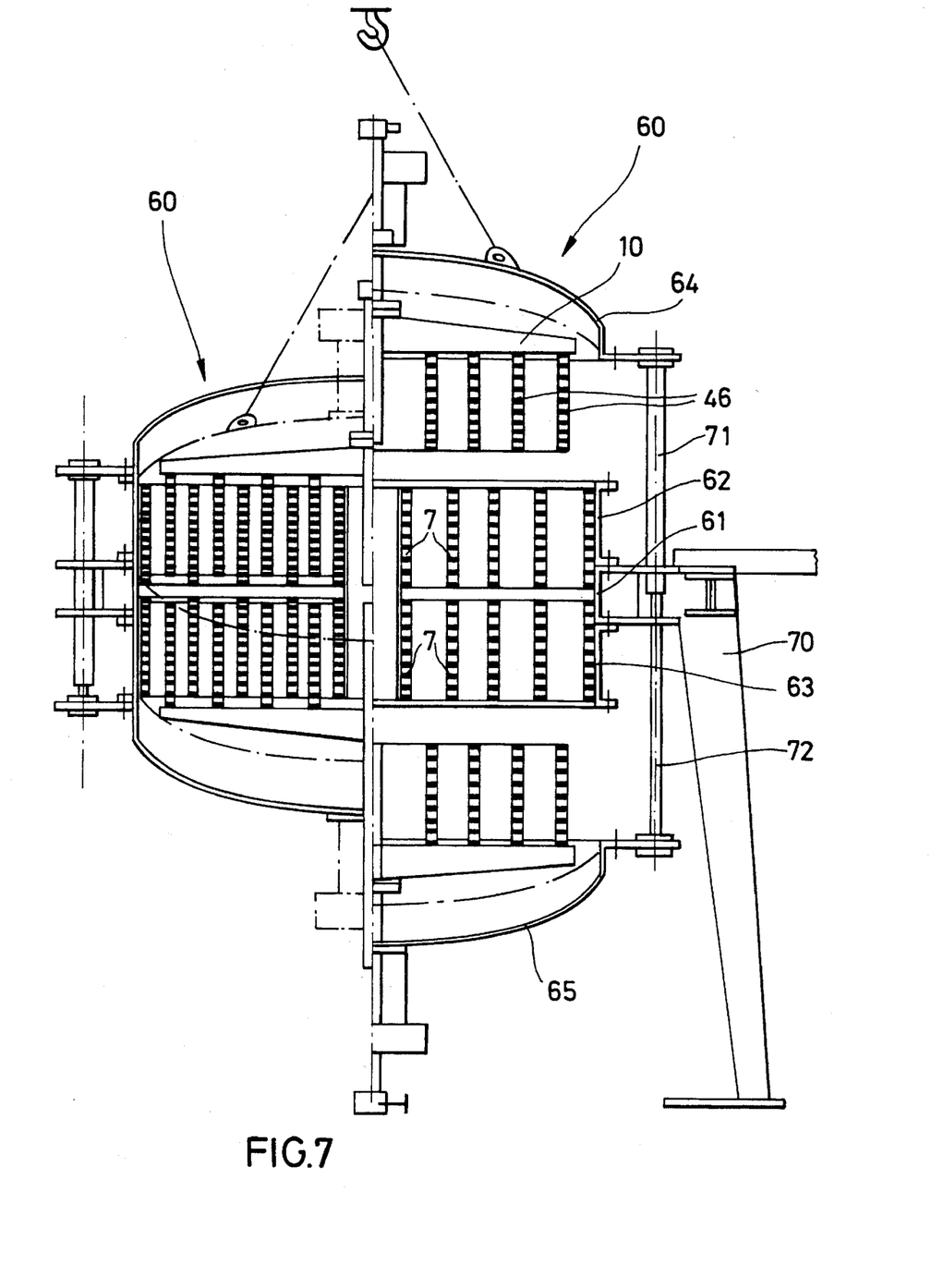
FIG. 7 shows a diagrammatic view in axial section of the filter press of FIG. 6, illustrating the manner in which this filter press can be opened for maintenance operations.

Diagrammatically shown in FIG. 7 is the construction of a mounting frame to which the individual components of pressure vessel 60 are connected in such a manner that the filter elements can be made accessible for maintenance or cleaning operations or for replacement of the filter media.

As shown in FIG. 7, intermediate cylindrical sidewall section 61 is secured to a carrier frame 70 supported on the ground by legs, only one of which is shown in FIG. 7, the remaining legs having been omitted for the sake of clarity. The lefthand half of FIG. 7 shows pressure vessel 60 in the closed state, whereas the righthand half of this figure shows the vessel in its opened state. Mounted on carrier frame 70 at lateral positions are hydraulic piston/cylinder units the cylinders 71 of which are secured to a laterally projecting flange portion of the vessel's top end wall 64, whereas their piston rods 72 are connected to a laterally projecting flange portion of bottom end wall 65. In the retracted state of the piston/cylinder units the top and bottom end walls 64 and 65, respectively, of vessel 60 assume the positions shown on the left in FIG. 7 in which their respective flanges are in contact with corresponding flanges of upper and lower cylindrical sidewall sections 62 and 63, respectively, to which they may be secured by threaded bolts or the like.

As long as bottom end wall 65 of vessel 60 remains attached to lower sidewall section 63, hydraulic cylinder 71 may be operated, after the respective retaining bolts have been released, to raise top end wall 64 to a position twice as high as its position shown on the right in FIG. 7. During this movement upper radial mounting structure 10 including the filter elements 46 suspended therefrom remains attached to top end wall 64 and is therefore also carried upwards. In the lowered position of top end wall 64, in which it is supported on the cylindrical sidewall of the vessel, the bolts connecting bottom end wall 65 to lower sidewall section 63 may be released, whereupon bottom end wall 65 can be lowered twice as far as illustrated on the right in FIG. 7, provided there is sufficient space below the vessel. It is also possible to completely remove both top and bottom end walls 64 and 65, respectively, from the vessel's cylindrical sidewall, if need be with the aid of a crane or the like as diagrammatically illustrated in FIG. 7. In the position shown on the right in FIG. 7, the cylindrical sidewall sections of the vessel are accessible and can be dismounted, if desired in a lateral direction, since the rotor shafts are no longer in the way.

Figure 8:
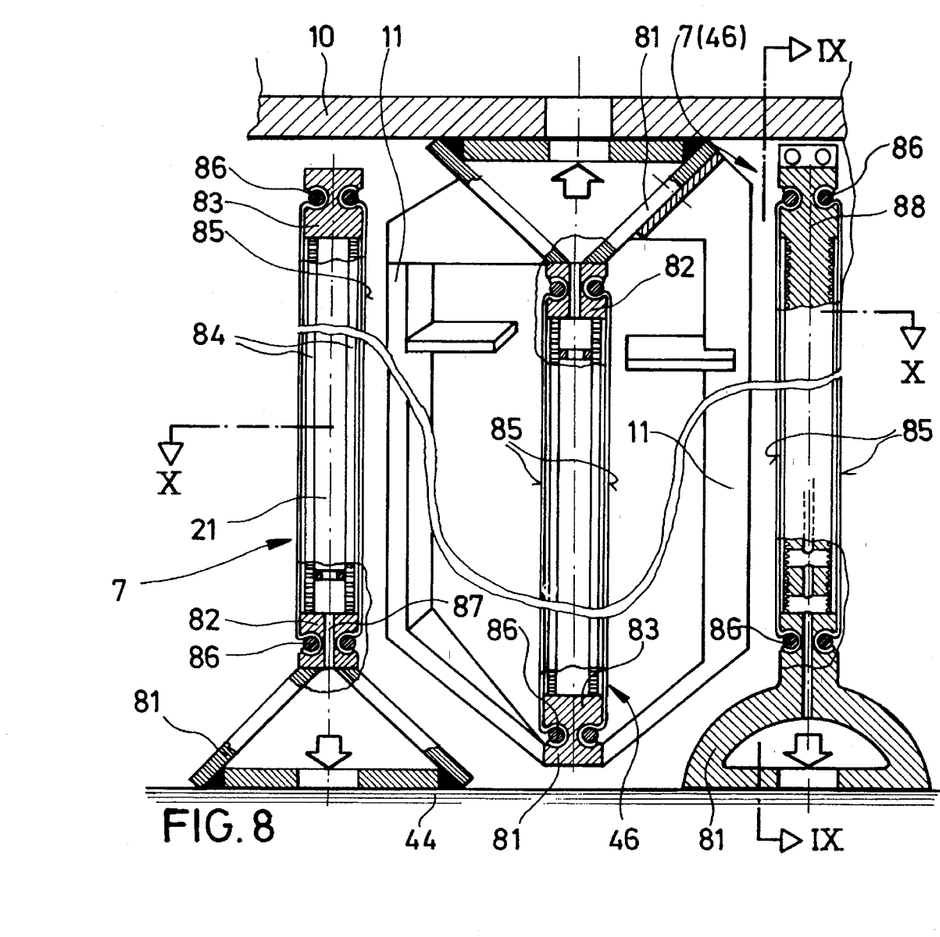
FIG. 8 shows an axially sectioned view on an enlarged scale of a detail of FIG. 6, illustrating the construction and arrangement of filter elements of two different types, namely, stationary filter elements disposed to the left and to the right of a movable filter element.

FIG. 8 shows an axial sectional view of parts of the filter press according to FIG. 3 or 6, respectively. Shown in this figure is the carrier structure 44 on which the stationary filter elements 7 are mounted. A rotatable filter element 46 extending into the space between stationary filter elements 7 is of a construction similar to that of filter elements 7 and suspended from a radial mounting structure 10 of which only a bottom wall is shown. The only portion to be seen of carrier structure 44 is its top wall. Radial mounting structure 10 and carrier structure 44 are of hollow construction and thus adapted to act as filtrate drain passages. FIG. 8 shows two different constructions of filter elements. In one of these constructions as shown on the left and in the center of this figure, each filter element comprises a hollow annular foot portion 81 of substantially triangular cross-sectional shape, and an annular member 82 of substantially square cross-sectional shape secured thereto. Disposed at an axially spaced position from annular member 82 is a second annular member 83 likewise of substantially square cross-sectional shape. Annular members 82 and 83 are connected to one another by a pair of perforate wall members 84 extending parallel to one another so as to define a filtrate chamber 21 therebetween. The perforate wall members 84, which are of cylindrical configuration, are covered by filter cloths 85 clampingly secured in grooves formed in annular members 82 and 83 by means of resilient O-rings 86. Filtrate chamber 21 communicates with the interior of foot portion 8 through a passage 87 formed in annular member 82 secured to foot portion 81. The interior of foot portion 81 on its part communicates with the interior of carrier structure 44. The filter element 46 secured to radial mounting structure 10 is substantially of the same construction, except that its filtrate chamber communicates with the hollow interior of mounting structure 10. In addition filter element 46 carries a number of bar-shaped rotor elements secured to both of its sides at circumferentially spaced locations for generating a flow of the fluid transversely past the filter cloths 85 of the stationary filter elements 7 as radial mounting structure 10 is being rotated.

On the right in FIG. 8 there is shown a second embodiment of a filter element for use selectively as a stationary filter element 7 or a revolving filter element 46. In this embodiment foot portion 81 has a substantially semicircular cross-sectional shape and is integrally connected to a cylindrical wall member 88 having a grooved surface configuration and formed with a plurality of internal passages communicating with the grooved surfaces, the latter being covered by respective filter cloths 85. At axial end portions of the cylindrical wall member 88 filter cloths 85 are clampingly secured in a similar manner as described above with reference to annular members 82 and 83.

Figure 9:
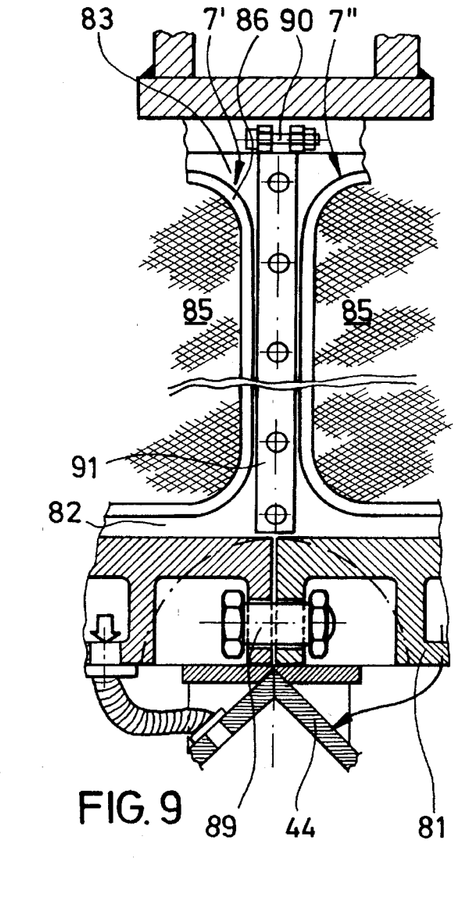
FIG. 9 shows a detail of the filter press of FIG. 6, in a radial section taken along the line IX—IX in FIG. 8.

For facilitating the maintenance of filter press 1 as well as the manufacture of the filter elements and the application of the filter cloths 85 thereto, filter elements 7 and 46, respectively, are preferably composed of a plurality of segments abutting one another in the circumferential direction. FIG. 9 depicts such an abutment joint between two filter element segments 7' and 7". The foot portions 81 of the segments are connected to one another by threaded bolts 89. At their axial ends opposite foot portions 81 they are similarly interconnected by further threaded bolts 90. This figure also shows the manner in which filter cloths 85 are clampingly secured to annular members 82 and 83, respectively, by means of O-rings 86. In the embodiment of FIG. 9, in which annular members 82 and 83, respectively, are composed of abutting segments, the end portions of the latter have to be interconnected by vertically extending web portions formed with grooves for receiving therein the vertically extending portions of respective O-rings 86. The gap between adjacent segments 7', 7" is suitably closed by flat strip members 91 bolted to both sides of segments 7' and 7".

Figure 10:
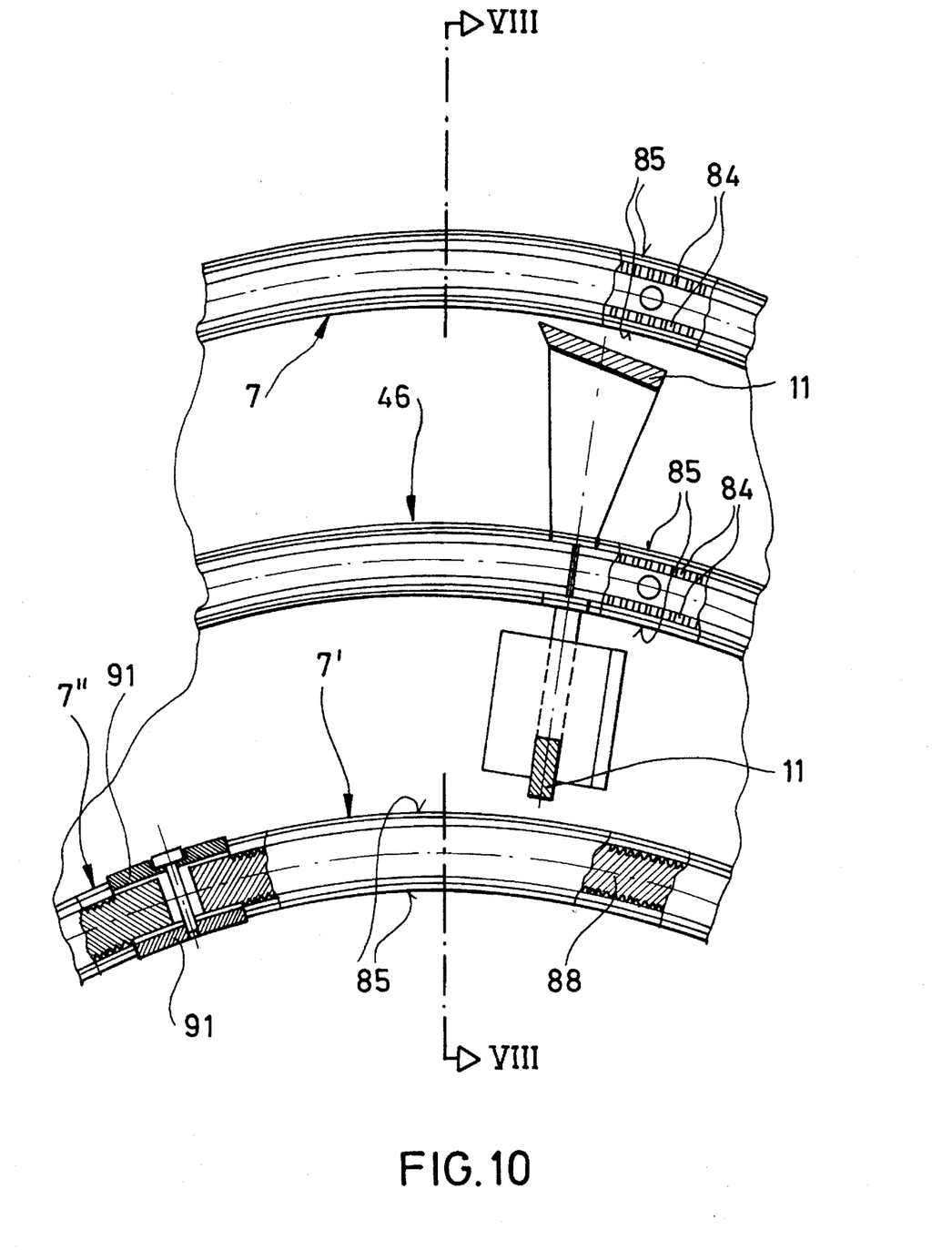
FIG. 10 shows a partial view on an enlarged scale as a radial section taken along the line X—X in FIG. 8.

FIG. 10 finally shows a radial sectional view of portions of two stationary filter elements 7 and a revolving filter element 46 extending therebetween. Particularly illustrated in this figure is the connection of two abutting filter elements 7', 7" formed by the above mentioned strip members 91. In the upper section of FIG. 10 it is also shown that rotor element 11 may be formed as an angularly oriented blade for imparting a radial component to the fluid flow adjacent the associated filter cloth 85 to thereby remove any accumulations of solids therefrom. For the remainder the components shown in FIG. 10 are designated by the same reference numerals as in the previously discussed figures, so that reference may be made to this discussion for a detailed description.

It should be finally mentioned that the invention is readily applicable to a modular construction. It is thus possible to vary the diameter of the filter press for providing a filter surface area adapted to existing needs. To this purpose the diameter of the pressure vessel may be increased or decreased for accommodating greater or smaller numbers, respectively, of filter elements. In a similar manner the filter surface area of the micro- and ultrafiltration apparatus can be increased or decreased by adding or removing individual sections. This can be accomplished in a particularly simple manner when the housing of the filtration apparatus is composed of separable sections and the rotor shaft is likewise composed, as already explained, of axially separable sections, permitting the shaft to be selectively lengthened or shortened.

In a modification, finally, of the embodiment shown in FIG. 1, the shafts 9 and 30 of the filter press 1 and of the micro- and ultrafiltration apparatus 2, respectively, could be connected to one another through bottom end wall 3, in which case the bottom end wall 3 would have to be formed with an opening provided with suitable sealing means (not shown) around the thus joined shafts. In this case the two shafts 9 and 30 are preferably joined by a separable and non-rotatable plug connection at the level of bottom end wall 3 so as to permit filter press 1 to be readily disconnected from micro- and ultrafiltration apparatus 2.

Although this modification is not shown in the drawings, it will be readily evident to the skilled artisan from an examination of FIG. 1, as will be the fact that only a single actuating motor is required for the operation of the combined filter separator as a whole.

I claim:

1. A filter apparatus for separating a pulp consisting of a composite fluid containing particles, comprising a cylindrical pressure vessel having a side wall and an upright axis and an inlet port, a plurality of filter elements formed as cylinder walls for taking up filtrate, at least some of the filter elements being provided with filter media on both sides thereof, the filter elements having different diameters and being arranged concentrically one within the other and with the vessel axis, annular spaces defined between the filter elements for feeding fluid to be filtered to the filter elements, said filter elements being divided into a first filter element group and a second filter element group so that adjacent filter elements are members of different groups, the filter elements of said first group being mounted on a transverse mounting structure which extends radially from a first hollow shaft, said first hollow shaft penetrating one end wall of the pressure vessel and being rotationally driveable, along with said mounting structure and first filter element group as a rotor, by a driving motor, said driving motor being arranged externally of the pressure vessel, filtrate chambers enclosed by the filter elements of said first group being drainable through at least one hollow transverse mounting bar of the transverse mounting structure and through said first hollow shaft, and the filter elements of the second group being mounted on a carrier structure extending transversely with respect to the vessel axis, said carrier structure comprising at least one drain channel connected to filtrate chambers enclosed by the filter elements of said second group for draining the filtrate chambers, and comprising an outlet port for removing the composite fluid enriched with particles from the pressure vessel.

2. The filter apparatus as set forth in claim 1, wherein the carrier structure is secured to an at least partially hollow second shaft extending concentrically with said vessel axis through another end wall of the vessel with a fluid-tight seal provided between said other end wall and said second shaft, said second shaft being connected to a driving motor, and wherein said carrier structure includes at least one hollow carrier arm having an interior space which communicates between said filtrate chambers of said second group of filter elements mounted on said carrier structure and the interior of said second shaft.

3. The filter apparatus as set forth in claim 2, wherein said first and second shafts are of different diameters, one of said first and second shafts being hollow for receiving part of the other of said first and second shafts therein, and being provided with guide elements for guiding said other shaft.

4. The filter apparatus as set forth in claim 2 or 3, wherein said second shaft extends through said other end wall, which is a bottom end wall of the vessel, said bottom end wall being provided with at least one closeable outlet port, and an agitator being secured to said second shaft within the vessel and closely adjacent said bottom end wall.

5. The filter apparatus as set forth in claim 1 or 2, wherein the filter elements of said first group have radially extending blades secured thereto so that free edges of the blades extend closely adjacent the filter elements of said second group.

6. The filter apparatus as set forth in claim 5, wherein passage openings are formed in said blades.

7. The filter apparatus as set forth in claim 6, wherein venturi nozzles are disposed in at least some of said passage openings.

8. The filter apparatus as set forth in claim 1 or 2, wherein the filter elements are each composed of a plurality of sediments abutting one another in the circumferential direction and connected to one another at their adjacent edges.

9. The filter apparatus as set forth in claim 1 or 2, wherein said filter media are clampingly secured by means of resilient O-rings in respective grooves formed in said filter elements.

10. The filter apparatus as set forth in claim 1 or 2, wherein the side wall is cylindrical and the end wall in which said first hollow shaft is mounted is releasably secured to the cylindrical side wall, and connected to hydraulic means operable to remove said end wall along the rotor mounted therein from said cylindrical side wall.

11. The filter apparatus as set forth in claim 1 or 2, wherein said carrier structure includes a plurality of hollow carrier arms the hollow interiors of which communicate separately with the filtrate chambers of different filter elements mounted thereon.

12. The filter apparatus as set forth in claim 1 or 2, wherein a space is defined between ends of the filter elements of said second group facing away from the transverse mounting structure and the adjacent end wall of the vessel, the thus defined space between the filter elements and said end wall housing an agitator secured to a rotor shaft.

13. The filter apparatus as set forth in claim 1 or 2, wherein each filter element of said first group is provided with at least one stripper element for each adjacent filter element of said second group, each said stripper element extending near the filter medium of the adjacent filter element of the second group.

14. The filter apparatus as set forth in claim 1 or 2, wherein the side wall is cylindrical and a radially outermost filter element is bounded by the cylindrical side wall of said vessel.

15. The filter apparatus as set forth in claim 1, wherein said carrier structure of the filter elements is fixedly located substantially at the longitudinal center of said vessel and carries axially extending filter elements on both sides, and said filter apparatus is provided with two rotors carrying filter element groups, said rotors being disposed at inverted positions opposite one another for rotation independently of each other.

16. A filter combination comprising a filter apparatus for separating a pulp and a micro- and ultrafiltration apparatus in a structural unit in which a lower end wall of the filter apparatus is at the same time an upper end wall of said micro and ultrafiltration apparatus and serves as a common end wall, wherein said filter apparatus comprises a cylindrical pressure vessel having a side wall and an upright axis and an inlet port, a plurality of filter elements formed as cylinder walls for taking up filtrate, at least some of the filter elements being provided with filter media on both sides thereof, the filter elements having different diameters and being arranged concentrically one within the other and with the vessel axis, annular spaces defined between the filter elements for feeding fluid to be filtered to the filter elements, said filter elements being divided into a first filter element group and a second filter element group so that adjacent filter elements are members of different groups, the filter elements of said first group being mounted on a transverse mounting structure which extends radially from a hollow shaft, said hollow shaft penetrating one end wall of the pressure vessel and being rotationally driveable along with said mounting structure and first filter element group, as a rotor, by a driving motor, said driving motor being arranged externally of the pressure vessel, filtrate chambers enclosed by the filter elements of said first group being drainable through at least one hollow transverse mounting bar of the transverse mounting structure and through said hollow shaft, and the filter elements of the second group being mounted to a carrier structure extending transversely with respect to the vessel axis, said carrier structure comprising at least one drain channel connected to filtrate chambers enclosed by the filter elements of said second group for draining the filtrate chambers, and comprising an outlet port for removing the composite fluid enriched with particles from the pressure vessel, wherein the micro- and ultrafiltration apparatus communicates with at least one filtrate outlet port of said filter apparatus and comprises: a housing of circular cross-sectional, the interior of said housing being divided by respective partitions into separate coaxially aligned filter sections each filter section including an inlet chamber, a filtrate chamber and said radially extending micro- and ultrafiltration filter medium separating said two chambers from one another, a rotor shaft penetrating at least one housing end wall and all of said filter sections, with fluid-tight seals provided at all of the partitions thus penetrated, a radially extending rotor element in each inlet chamber carried by said rotor shaft, a second driving motor disposed externally of said housing and connected to said rotor shaft, and a plurality of filtrate discharge conduits communicating with respective filtrate chambers of said micro- and ultrafiltration apparatus.

17. The filter combination as set forth in claim 16, wherein the filtrate chambers of the filter apparatus and the inlet chamber of the adjacent filter section of the micro- and ultrafiltration apparatus are in direct communication through passages in the common end wall.

18. The filter combination as set forth in claim 17, wherein the inlet chambers of said micro- and ultrafiltration apparatus are interconnected through conduits each conduit being provided with a shut-off valve.

19. The filter combination as set forth in claim 18, wherein the rotor shaft of said micro- and ultrafiltration apparatus consists of a plurality of axially interengaged sections each having a respective rotor element secured thereto.

20. The filter combination as set forth in claim 16, wherein in said micro- and ultrafiltration apparatus each of said rotor elements includes at least two radially extending arms disposed at equal angular spacings and secured to said rotor shaft within respective inlet chambers above the associated filter medium.

21. The filter combination as set forth in claim 20, wherein the rotor shaft of said micro- and ultrafiltration apparatus is composed of a plurality of axially interengaged sections each having a respective rotor element secured thereto.

22. The filter combination as set forth in claim 16, wherein said sections of said micro- and ultrafiltration apparatus are of successively decreasing diameter.

23. The filter combination as set forth in claim 22, wherein the rotor shaft of said micro- and ultrafiltration apparatus is composed of a plurality of axially interengaged sections each having a respective rotor element secured thereto.

24. The filter combination as set forth in claim 16, wherein in the separate sections of said micro- and ultrafiltration apparatus said filter media are secured to filter element discs sealingly and releasably supported on an interior wall surface of said housing of said micro- and ultrafiltration apparatus and acting at the same time as said partitions between separate sections.

25. The filter combination as set forth in claim 24, wherein each filter element disc is composed of at least two sectors individually covered with filter media and releasably connected to one another.

26. The filter combination as set forth in claim 16, wherein in the separate sections of said micro- and ultrafiltration apparatus the filter media are formed by porous diaphragms of different pore size.

27. The filter combination as set forth in claim 16, wherein the shafts of said filter apparatus and said micro- and ultrafiltration apparatus, respectively, are interconnected through said common end wall of said filter apparatus and said micro- and ultrafiltration apparatus to form a plug-joined shaft assembly to be rotated by a common drive source.

* * * * *

UNITED STATES PATENT AND TRADEMARK OFFICE
CERTIFICATE OF CORRECTION

PATENT NO. : 5,474,675
DATED : December 12, 1995
INVENTOR(S) : Dieter Kupka

It is certified that error appears in the above-indentified patent and that said Letters Patent is hereby corrected as shown below:

In claim 8, line 3, at column 12, line 66, first word "sediments" should read --segments--.

Signed and Sealed this

Second Day of April, 1996

Attest:

BRUCE LEHMAN

*Attesting Officer*  *Commissioner of Patents and Trademarks*